INVENTOR.
Clarence A. Henneuse.
BY
Fay, Oberlin & Fay
ATTORNEYS.

Aug. 16, 1932.   C. A. HENNEUSE   1,872,450
TRACTION APPARATUS
Filed May 19, 1927   3 Sheets-Sheet 3

INVENTOR.
Clarence A. Henneuse
BY
Fay, Oberlin + Fay
ATTORNEYS.

Patented Aug. 16, 1932

1,872,450

UNITED STATES PATENT OFFICE

CLARENCE ALVIN HENNEUSE, OF BUCYRUS, OHIO

TRACTION APPARATUS

Application filed May 19, 1927. Serial No. 192,696.

This invention relating, as indicated, to traction apparatus refers more particularly to improvements in the general construction of tractors and in the steering and driving mechanisms thereof. An object of the invention is to substitute in a tractor a set of traction members in the form of the so-called "track-laying treads" in place of the usual wheels, and to so construct the mountings for such tread that same may be expeditiously substituted for such wheels.

A further object of the invention is to provide in place of the usual differential gear mechanism of tractors, a mechanism which positively connects the axles or driven elements with the engine drive thereof. In this connection it has been found desirable to also provide disengageable members between the driving shaft and the driven members, i. e., the sprocket wheels engaged with the track-laying treads, and for this purpose I have devised certain novel connecting mechanisms which are so constructed that the power transmitted to the driven elements is utilized to effect the disconnection of such connecting members.

A further object of my invention is to provide means for effecting the disconnection of the means between the driving and driven elements regardless of the direction of rotation thereof.

A still further object of the invention relates to an improved steering device which is adapted to selectively control the disengagement of either set of connecting elements interposed between the driving shaft and each of the tread members. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 1:
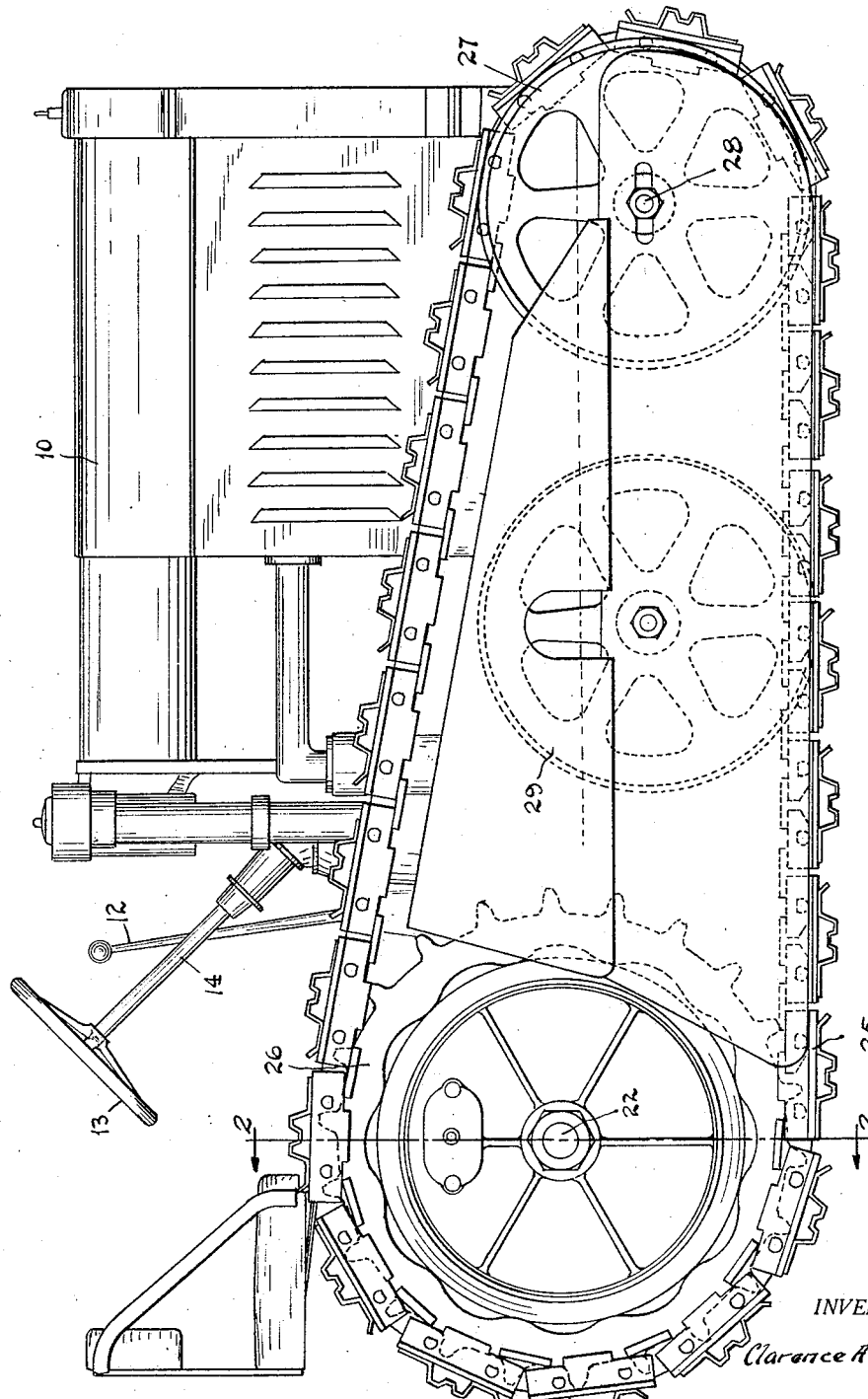
Figure 2:
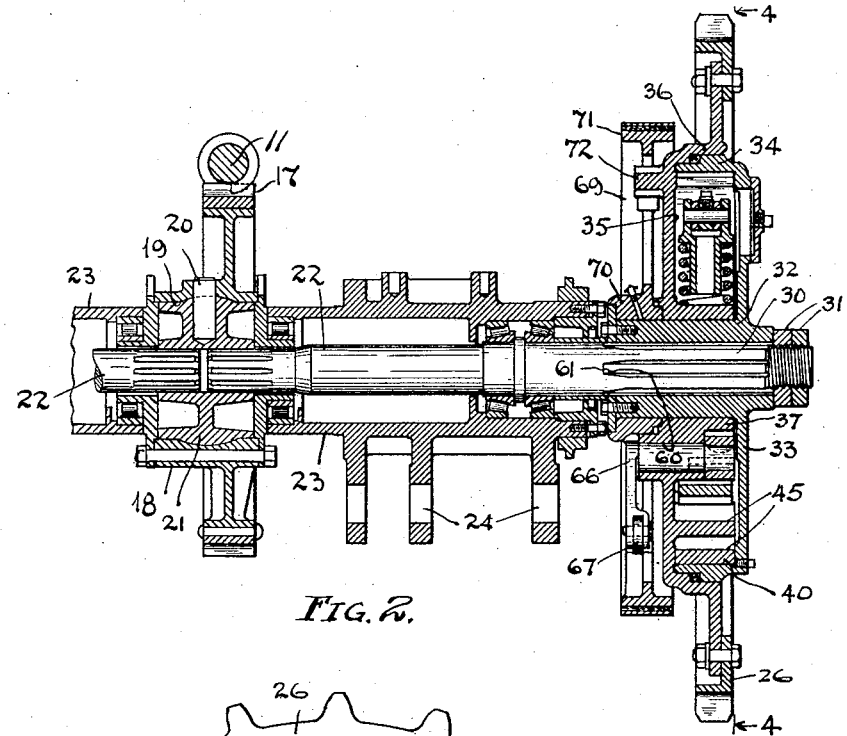
Figure 3:
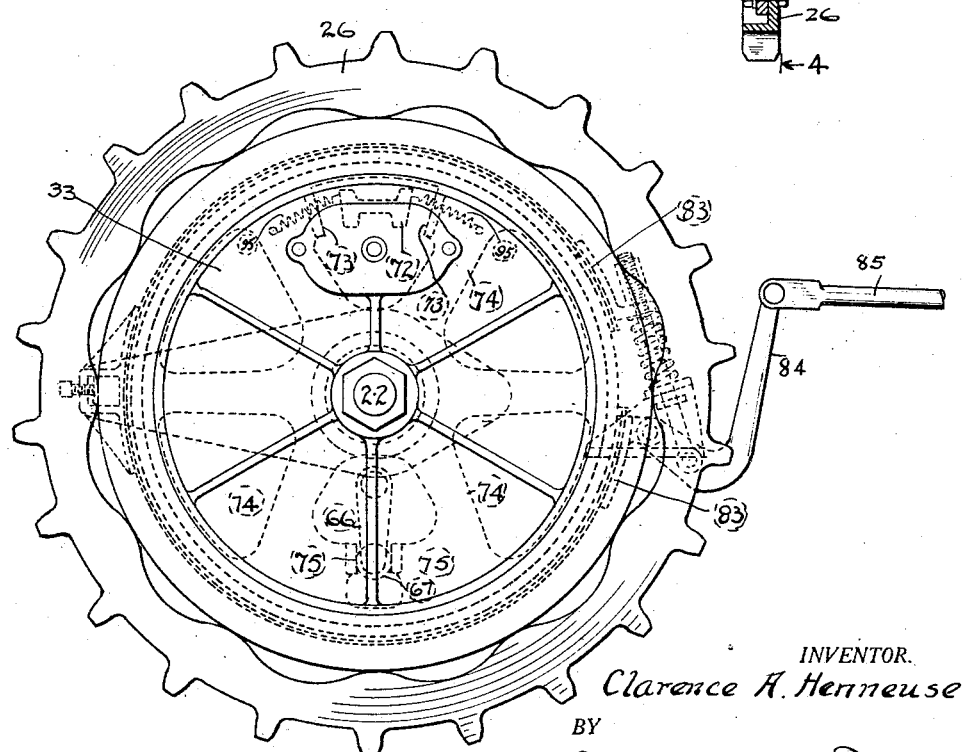
Figure 4:
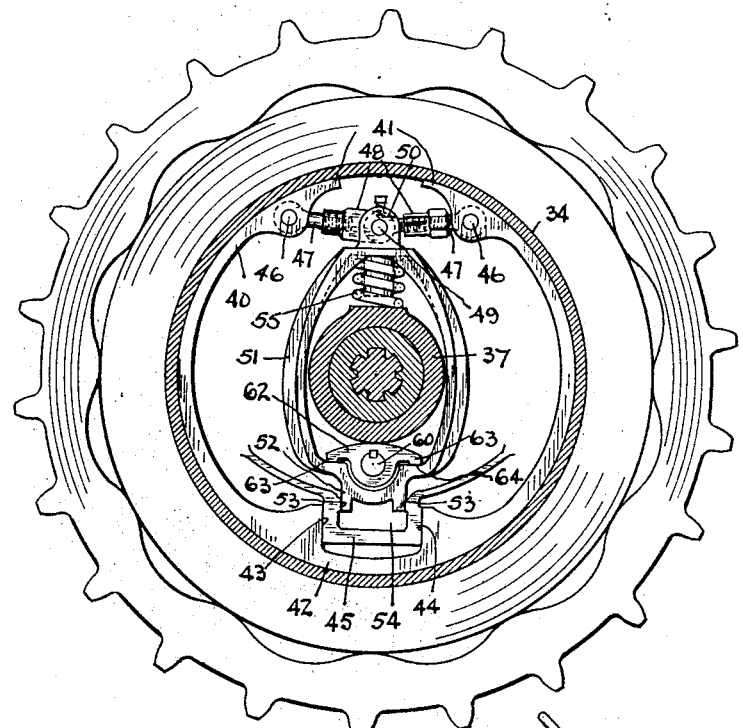
Figure 5:
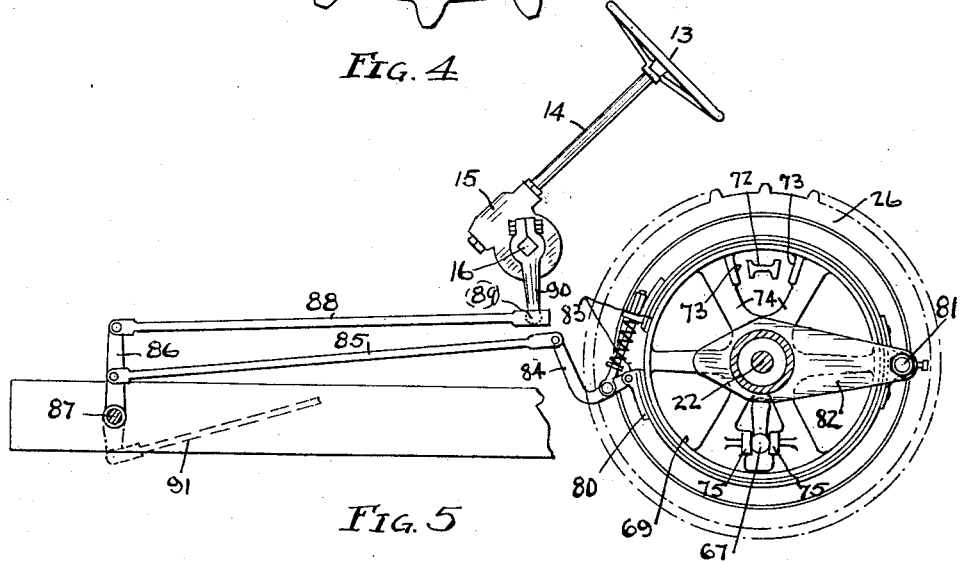

Fig. 1 is a side elevation of a tractor having my improved tread and other novel devices applied thereto; Fig. 2 is a transverse vertical section of one of the tread driving sprockets and rear axle as taken on line 2—2 of Fig. 1; Fig. 3 is an enlarged side elevational view of one of the tread driving sprockets showing in dotted lines, certain of the improved operating elements; Fig. 4 is a view taken on line 4—4 of Fig. 2, looking in the direction of the arrows, illustrating in detail the connecting mechanisms between the driving and driven elements; and Fig. 5 is a diagrammatic view showing the connections between the steering wheel and the driven elements.

In the accompanying drawings I have illustrated a tractor which consists of a suitable frame, a power plant or engine 10 carried upon a suitable frame and having a drive shaft 11. The usual shifting lever 12 is provided to selectively engage the drive shaft 11 with the crank shaft of the motor and mounted in the proximity of the rod 12 is a steering wheel 13 at the top of a column or rod 14 supported in a housing 15 and having suitable worm and gear connections to actuate a shaft 16. The further function of the shaft 16 will be described more in detail hereinafter.

As has been previously stated, this invention contemplates the substitution of a positive drive connection in place of the usual differential gearing of the tractor. In Fig. 2 is seen the drive shaft 11 connected to operate a gear 17 provided on the exterior of a rotatable housing 18. This housing 18 is provided with a central bore 19 in which is secured, by pins 20, a member 21 to which the axles 22 are connected. These axles 22 are shown as being formed of two pieces and are splined to the member 21, but it will be obvious that they may be made as one and other connections be provided as is desired. The gear 17 and the housing 18 is adapted to rotate between the respective ends of rear axle housings 23 which may be mounted upon or secured to the tractor frame by connections to the laterally projecting arms 24 in any suitable manner. In providing the construction recited above I am able to assemble on an ordinary commercial tractor, after first having removed the differential gearing, my improved connections with little or no changes in the tractor parts. In the illustrated embodiment is shown a pair of rear axles, which may be those provided in connection with the differential mechanism of the tractor, rigidly secured together by the member or fixture 21.

At the outer end of each axle is carried a sprocket wheel or a like member upon which is supported and driven the tread 25. This tread may be of any conventional form and the details thereof will not be gone into here, it being sufficient to say that the same is supported at one end by the sprocket 26 and at its other extremity upon an idler wheel 27. This wheel 27 is mounted upon an axle 28 carried at the front end of the tractor frame as shown in Fig. 1. An intermediate idler 29 may also be provided to support the road engaging portion of the tread between the sprocket 26 and the wheel 27.

Between each of the sprockets 26 and the corresponding axle 22 is provided the improved disengageable connecting mechanisms of my invention. As stated in the objects, it is within the purview hereof to so construct these novel mechanisms that they function to disconnect the driving relation between the axles 22 and the sprockets 26 through the application of the power transmitted from such axles. Referring now to Fig. 2, at the outer end of the axle 22 is secured by splines 30 and lock nuts 31, the hub 32 of an annular member 33. This member 33 is positioned in co-axial alignment with the sprocket 26 and has formed at its outer periphery an inturned flange 34. The sprocket 26 is dished out to provide a socket or annular recess 35 to receive the flange 34 and other mechanisms as will presently appear, and at 36 such sprocket is formed to fit the outer configuration of flange 34. The inner portion of the sprocket 26 is provided with a lateral flange or hub portion 37 which is rotatably engaged about the exterior of hub 32, this latter engagement and that between the flanges 34 and 36 serving to mount the sprocket 26 about the annular member 33.

In Fig. 4 is illustrated means for clutching the annular member 33, which, as has been described, is fixed with respect to axial movement at the end of axle 22, to the sprocket wheel 26. These means are carried within the socket 35 adjacent to the member 33 and consist of an expansible brake shoe 40, fixed from rotation with respect to the sprocket 26 and having means engaged between the ends 41 thereof to expand the same into engagement with the flange 34. The intermediate portion 42 of the brake shoe is formed to provide a radially extending recess 43 which has its sides 44 slidably engaged with a boss or projection 45 formed on the sprocket wheel 26 and extending laterally within the socket 35. To the ends 41 of the brake shoe are pivotally connected upon pins 46 the ends 47 of a pair of toggle links 48 which are in turn connected together at their other ends about a pivotal pin 49.

These links 48 may be formed of two parts and screw-threaded together to provide suitable adjustment therein to take up the wear incidental to the continued use of the brake shoe 40. The pin 49 is fixed to the end 50 of an operating member or yoke 51 which has its other end 52 formed to slidingly fit the sides 53 of a recess 54 formed by the projection 45 at its interior. This yoke 51, as seen in Fig. 4, surrounds the axle and the hubs 32 and 37 and is acted upon by a spring 55 interposed between the outer surface of hub 37 and the end 50 to normally press the upper portion of the yoke radially outwardly from the projection 45. The result of the action of such spring tends to straighten the toggle links 48 and thus normally engage the brake shoe which is non-rotatably carried by the sprocket with the rotating member 33, and in this way establish driving connection between the mechanism and such sprocket.

Also provided in connection with the mechanisms described immediately above are means which are adapted to automatically cause the disengagement of the brake shoe 40 with the flange 34. Mounted at the end of a stud shaft 60, which is carried in an aperture 61 formed in the side wall of the sprocket 26 parallel to the axis of the axle 22, is a cam member 62. This cam 62 is provided with lateral projections 63 at each side thereof which are adapted to overlie lateral faces 64 provided on the interior of yoke member 51, it being obvious that upon rotation of the shaft 60 in either direction, one of the projections 63 will move the yoke 51 in a direction to oppose the spring 55 and thus contract the ends 41 of the brake shoe. At the other end of shaft 60 is fixed a radially projecting arm 66, which arm is located in a plane exteriorly of the sprocket wheel 26 and has at its outer end a cam roll 67 by which the shaft 60 is adapted to be actuated in a manner to be presently described.

Also mounted on the hub 32 of the driving member is an annular drum 69 having its inner portion 70 so formed as to rotatably fit the exterior of hub 32 and its outer portion 71 shaped into a transverse peripheral flange to provide an external braking surface. The sprocket wheel 26 is provided with a lateral, outwardly extending projection 72, which is received, as indicated in dotted lines in Fig. 3, between the adjacent faces 73 of the spokes 74 of the brake drum 69. In this manner driving relation is established between such brake drum and the sprocket wheel. Between another pair of spokes 74, preferably diametrically of the position of projection 72, is received the arm 66 and the adjacent faces of such latter two spokes are formed with cam surfaces 75 which act upon the roller 67.

During the normal operation of the driving mechanisms described above, i. e., the connection of the axle with the sprocket wheel, the wheel together with the brake drum 69 rotates with the annular member 33 on account of the engagement of the brake shoe. When it is desired to disengage the sprocket from its connection to the axle, it is merely necessary to apply a brake to the drum 69 to retard the rotation thereof, which action causes the arm 66 to rock about its axis and thus contract the ends 41 of the brake shoe through the movement of yoke 51. In addition to performing the function of disengaging the brake shoe with the driving member through the application of a brake to the drum 69, the stopping or holding of the brake drum from rotation serves also to prevent the rotation of the sprocket wheel 26 through the engagement of the projection 72 with the faces 73 as described. In this manner it will be obvious that I not only utilize the power exerted from the axle 22 to effect the disengagement of the driving clutch or brake 40, but also utilize this power to aid in holding the sprocket from rotation. This feature is quite important in apparatus of the present character and it is possible to very effectively steer the tractor by comparatively light mechanisms with the expenditure of very little manual force.

In Fig. 5, I have illustrated certain connections by which the brake bands encircling the drums 69 are operated. The brake bands are indicated at 80 and consist of a split annular member having its intermediate portion secured about a pin 81 mounted in the end of a fixed arm 82 and its ends connected to a toggle mechanism of ordinary construction such as indicated at 83.

The arm 84 forming a part of the toggle mechanism is connected at its outer end to a drag link 85 which in turn is connected at its outer end to a pivoted lever 86 mounted about a stub 87 on the frame of the tractor. Also connected to the arm 86 is an operating link 88 which is operated through suitable connections 89 at the end of a lever 90 which is secured to the shaft 16. The steering mechanism or brake actuating mechanism just described serves to actuate the engagement of the brake shoes carried at each side of the tractor. The connection to the brake band located at the opposite side of the tractor from the position indicated in Fig. 5 is shown in dotted lines at 91 in such figure. This link 91 is connected to the arm 86 at the other side of its pivotal mounting to that of the point of connection of link 85, the purpose obviously being to cause the actuation of one or the other of the brake bands 80, depending upon the rotation of the steering mechanism.

On account of the usage to which tractor devices of the present character are put, the exposed operating mechanisms are subjected to the dirt of the road over which they travel. For this reason, the brake drum 69 and its cooperating friction element are apt to become coated with dirt and consequently the shoe 80 will tend to exert friction to such drum even though the steering apparatus is not being actuated. If this occurs, the retardation of drum 69 will permit through its engagement with the lug 72 a certain slippage in the clutching elements between the axle and the wheel. To overcome this objection, I provide tension springs 95 as seen in Fig. 3 of the drawings connected to each side of projection 72 and to the adjacent spokes 74 of the brake drum 69. These springs do not prevent the actual engagement of surfaces 73 with the projection 72 when the brake has been applied but do effectively overcome the friction incidental to the clogging of the brake drum with dirt.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In an apparatus of the character described, the combination of an axle, a wheel rotatably carried thereon, an annular member fixed to said axle and rotatably engaged with said wheel, a friction member carried by said wheel and engageable with said annular member, means for normally maintaining such engagement, a cam member mounted on said wheel, connections between said cam and said friction means, a brake and means adapted to actuate said cam to disengage said friction means upon the application of said brake.

2. In an apparatus of the character described, the combination of an axle, a wheel rotatably carried thereon, an annular member fixed to said axle and rotatably engaged with said wheel, a friction member carried by said wheel and engageable with said annular member, means for normally maintaining such engagement, means carried by said wheel for disengaging said friction member, and means operable exteriorly of said wheel for effecting the operation of said disengaging means upon the rotation of said wheel.

3. In an apparatus of the character described, the combination of an axle, a wheel rotatably carried thereon, an annular member fixed to said axle and rotatably engaged with said wheel, a friction member carried by said wheel and engageable with said annular member, means for normally maintaining such engagement, means carried by said wheel for disengaging said friction member, and means operable exteriorly of said wheel for effecting the operation of said disengaging means upon the rotation of said wheel in either directon.

4. In an apparatus of the character described, the combination of an axle, a wheel rotatably carried thereon, disengageable means for connecting said wheel to said axle, operating means for disconnecting said first means, an annular member mounted coaxially of said wheel and being connected to said operating means, whereby the non-rotation of said annular member will effect the disengagement of said wheel with said axle, and resilient means connecting said wheel to said annular member.

Signed by me, this 7th day of May, 1927.
CLARENCE ALVIN HENNEUSE.